United States Patent
Little

(10) Patent No.: US 8,245,629 B2
(45) Date of Patent: Aug. 21, 2012

(54) LIQUID INFUSING AND FLAVOURING DEVICE

(75) Inventor: Christoph John Little, Nelson (NZ)

(73) Assignee: C Little Engineering Limited (NZ)

( * ) Notice: Subject to any disclaimer, the term of this patent is extended or adjusted under 35 U.S.C. 154(b) by 267 days.

(21) Appl. No.: 12/599,183

(22) PCT Filed: May 2, 2008

(86) PCT No.: PCT/NZ2008/000099
§ 371 (c)(1),
(2), (4) Date: Nov. 6, 2009

(87) PCT Pub. No.: WO2008/140331
PCT Pub. Date: Nov. 20, 2008

(65) Prior Publication Data
US 2010/0221404 A1    Sep. 2, 2010

(30) Foreign Application Priority Data

May 9, 2007    (NZ) .................................. 555085

(51) Int. Cl.
*A47J 31/00*    (2006.01)
(52) U.S. Cl. ................ 99/322; 99/317; 99/279; 99/323; 206/0.5
(58) Field of Classification Search .................... 99/279, 99/275, 295, 323, 317, 321, 322; 239/310, 239/315, 316, 373; 206/0.5, 219; 210/198.1; 222/145.5, 190
See application file for complete search history.

(56) References Cited

U.S. PATENT DOCUMENTS

| | | | | |
|---|---|---|---|---|
| 3,095,892 A | * | 7/1963 | Laing et al. | 137/101.11 |
| 3,575,352 A | * | 4/1971 | Hall et al. | 239/434.5 |
| 3,901,262 A | * | 8/1975 | Gutkowski | 137/101.11 |
| 4,218,014 A | | 8/1980 | Tracy | |
| 5,954,272 A | * | 9/1999 | Liao | 239/317 |
| 7,650,830 B1 | * | 1/2010 | Lessis | 99/279 |
| 7,740,754 B2 | * | 6/2010 | Fite | 210/97 |
| 7,784,715 B2 | * | 8/2010 | Kress | 239/310 |

FOREIGN PATENT DOCUMENTS

| | | |
|---|---|---|
| EP | 672616 | 12/1997 |
| WO | 8802612 | 4/1988 |

* cited by examiner

*Primary Examiner* — Reginald L Alexander
(74) *Attorney, Agent, or Firm* — Brooks Kushman P.C.

(57) ABSTRACT

A liquid infusing and flavoring device for the infusing and/or flavoring of liquids. The liquid infusing and flavoring device includes an inlet passage connectable to a liquid (typically beer) to allow liquid to flow into the liquid infusing and flavoring device. An outlet passage allows the liquid to flow out of the liquid infusing and flavoring device and which the outlet passage is connectable to the inlet portion of a liquid dispensing tap. The liquid infusing and flavoring device has a container that houses the infusing and/or flavoring substance. The container is in selective fluid communication ith the with the inlet and outlet passages. In order to allow the liquid to pass through the liquid infusing and flavoring device, there is situated between the inlet and outlet passages a three way valve operable between a non-infusing-flavoring mode and an infusing-flavoring mode.

19 Claims, 4 Drawing Sheets

LIQUID INFUSING AND FLAVOURING DEVICE

This invention relates to a Liquid Infusing and Flavouring Device, typically for the infusing and/or flavouring of alcoholic beverages such as beer

BACKGROUND OF INVENTION

The concept of infusing liquids has been part of civilisation for many centuries, in particular is commonly associated with the making of the humble cup of tea where the infusing of tea leaves to produce a beverage dates back thousands of years. The flavouring of traditional alcoholic beverages to produce flavoured alcoholic drinks is gaining popularity amongst the brewers and consumers alike, no more so than in the making of beer.

The growing popularity of boutique or premium beers, poses new problems to the industry. Consumers are seeking new experiences and demanding an ever increasing range of tastes, flavours and aromas in their beer. At the same time, the palate has become better educated and able to distinguish subtle differences. Traditionally, the taste, flavour and aroma of beer was determined by the brewer during the brewing process and finalized prior to point of dispense. The consumer was unable to customize the taste, flavour and aroma of their beer at the point of dispensing. This disadvantage of dispensing beer is that the consumer is not able to infuse the beer with infusible flavouring substance at the point of dispensing into a receptacle for drinking. The problem is that infusing and flavouring beer is completed during the brewing process and not at the point of dispensing.

The current known ways of infusing and flavouring beer relate to the brewing processes used in manufacturer of beer prior to the point of dispensing are:
  a) During the boil: Infusing wort in the wort kettle with hops, spices or fruit. Infusion is during the boiling of the wort prior to addition of yeast. Note that technically wort is not regarded as beer.
  b) Hop Back: "Wort from the kettle is run into the hop back and strained by the slotted base . . . . Wort flow through the hop back is controlled by adjusting the valve on the positive side of the wort pump, which applies back pressure" (Quoted from page 221 Goldammer, T. (1999) *The Brewers. handbook: The complete book to brewing beer*. KVP Publishers: Clifton Press).
  c) Hop Jack: "A device that is used by large breweries and that has features such as sparge, recirculation, underletting, and spent hops discharge . . . . The hop jack can also be used to enhance flavour and aroma by adding fresh, whole hops to the strainer basket" (Quoted from page 221 Goldammer, T. (1999) *The Brewers. handbook: The complete book to brewing beer*. KVP Publishers: Clifton Press.)
  d) During Fermentation: Infusion with hops, spices or fruit during the fermentation process. Dry hopping is the process where hops is added to the primary fermenter, the maturation tank, conditioning tank or the casked beer aimed at increasing the aroma and hop characteristics of the beer.

OBJECT OF THE INVENTION

It is an object of the invention to provide a Liquid Infusing and Flavouring Device, typically for the infusing and flavouring of alcoholic beverages such as beer, that ameliorates some of the disadvantages and limitations of the known art or at least provide the public with a useful choice.

SUMMARY OF INVENTION

In a first aspect the invention resides in a liquid infusing and flavouring device, typically for the infusing and/or flavouring of alcoholic beverages such as beer, the liquid infusing and flavouring device includes:
  i. an inlet passage through which a liquid is adapted to flow in to the liquid infusing and flavouring device;
  ii. an outlet passage through which the liquid is adapted to flow out of the liquid infusing and flavouring device;
  iii. a holding means for holding a desired infusible and/or flavouring substance therein, the holding means is adapted to be in selective fluid communication with the inlet and outlet passages; and
  iv. a diverting means positioned between the inlet passage and outlet passage and operable between a non infusing-flavouring mode and an infusing-flavouring mode, wherein,
    a. when in the non infusing-flavouring mode the diverting means is adapted to cause the liquid flowing through the liquid infusing and flavouring device to by-pass the infusing and flavouring holding means, and
    b. when in the infusing-flavouring mode the diverting means is adapted to divert the liquid flowing through the liquid infusing and flavouring device into the infusing and flavouring holding means and then out through the outlet passage such that the liquid exiting the outlet passage is infused and/or flavoured.

Preferably, the liquid is an alcoholic beverage.

Preferably, the liquid is beer.

Preferably the liquid is suitable to be infused and/or flavoured with any one of the fruit, herbs, spices, flowers, hops, syrups, plants, extracts of the aforementioned, or any other suitable infusible and/or flavouring substance or any combination thereof.

Preferably, the infusible and/or flavourable substance are in either solid, particulate, granular, powdered, paste, semi liquid, vapour or gaseous form Preferably, the holding means is a container adapted to contain the infusible and/or flavourable substance therein.

Preferably the container is releasably attachable to the liquid infusing and flavouring device so that the container is able to be replaced with another container containing a different infusible and/or flavouring substance.

Preferably the container is releasably attachable to the liquid infusing and flavouring device so that the infusible and/or, flavouring substance within the container is able is able to be replaced with a different infusible and/or flavouring substance.

Preferably, the diverting means is a valve adapted to be operable between the non infusing-flavouring mode and the infusing-flavouring mode.

Preferably, the valve is a three-way valve.

Preferably, the three-way valve has a valve body connected and in fluid communication with the inlet and outlet passages, wherein the valve body includes:
  i. a handle adapted to operate the valve between the non infusing-flavouring mode and the infusing-flavouring mode;
  ii. a rotary valve member having a by-pass passage, an inlet diverting passage and an outlet diverting passage, the rotary valve member is connectable to the handle and adapted to rotate upon operation of the handle between the non infusing-flavouring mode when the handle is in the non infusing-flavouring mode and an infusing-flavouring position when the handle is in the infusing-flavouring mode, such that when in the non-infusing-flavouring position the by-pass passage is in fluid communication with both the inlet and outlet passages to allow the liquid to flow directly there-through so as to by pass the holding means and when the rotary valve member is in the infusing-flavouring position the inlet diverting passage is in fluid communication with the holding means and the outlet diverting passage is in fluid communication with the holding means and the outlet passage so that liquid flowing through the liquid infusing and flavouring device is diverted into the holding means to be infused and/or flavoured before-exiting the outlet passage in order to produce an infused and/or flavoured liquid.

Preferably, a filtering means is situated between the holding means and the outlet passage inn order to filter the infused and/or flavoured liquid.

Preferably, the filtering means is positioned adjacent and in communication with an inlet end of the diverting outlet passage.

Preferably, the filtering means is a micron filter.

In a second aspect the invention resides in a liquid infusing and flavouring device, typically for the infusing and/or flavouring of alcoholic beverages such as beer, the liquid infusing and flavouring device includes:
  i. an inlet passage through which a liquid is adapted to flow in to the liquid infusing and flavouring device;
  ii. an outlet passage through which the liquid is adapted to flow out of the liquid infusing and flavouring device;
  iii. a holding means for holding a desired infusible and/or flavouring substance therein, the holding means is adapted to be in selective fluid communication with the inlet and outlet passages; and
  iv. a diverting means positioned between the inlet passage and outlet passage and operable between a non infusing-flavouring mode and an infusing-flavouring mode Preferably, when in the non infusing-flavouring mode the diverting means is adapted to cause the liquid flowing through the liquid infusing and flavouring device to by-pass the holding means.

Preferably, when in the infusing-flavouring mode the diverting means is adapted to divert the liquid flowing through the liquid infusing and flavouring device into the holding means and then out through the outlet passage such that the liquid exiting the outlet passage is infused and/or flavoured.

Preferably, the diverting means is a valve adapted to be operable between the non infusing-flavouring mode and the infusing-flavouring mode.

Preferably, the valve is a three-way valve.

Preferably, the three-way valve has a valve body connected and in fluid communication with the inlet and outlet passages, wherein the valve body includes:
  i. a handle adapted to operate the valve between the non infusing-flavouring mode and the infusing-flavouring mode;
  ii. a rotary valve member is connectable to the handle and adapted to rotate upon operation of the handle between the non infusing-flavouring mode when the handle is in the non infusing-flavouring mode and an infusing-flavouring position when the handle is in the infusing-flavouring mode.

Preferably, the rotary valve member has a by-pass passage, an inlet diverting passage and an outlet diverting passage, wherein when in the non-infusing-flavouring position the by-pass passage is in fluid communication with both the inlet and outlet passages to allow the liquid to flow directly there-through so as to by pass the holding means and when the rotary valve member is in the infusing-flavouring position the inlet diverting passage is in fluid communication with the holding means and the outlet diverting passage is in fluid communication with the holding means and the outlet passage so that liquid flowing through the liquid infusing and flavouring device is diverted into the holding means to be infused and/or flavoured before exiting the outlet passage in order to produce an infused and/or flavoured liquid.

In a third aspect the invention resides in a beer infusing and flavouring device, typically for the infusing and/or flavouring of alcoholic beverages such as beer, the beer infusing and flavouring device includes:
  is an inlet passage through which beer is adapted to flow in to the beer infusing and flavouring device;
  ii. an outlet passage through which the beer is adapted to flow out of the beer infusing and flavouring device;
  iii. a holding means for holding a desired infusible and/or flavouring substance therein, the holding means is adapted to be in selective fluid communication with the inlet and outlet passages; and
  iv. a diverting means positioned between the inlet passage and outlet passage and operable between a non infusing-flavouring mode and an infusing-flavouring mode, wherein,
    a. when in the non infusing-flavouring mode the diverting means is adapted to cause the beer flowing through the beer infusing and flavouring device to by-pass the infusing and flavouring holding means, and
    b. when in the infusing-flavouring mode the diverting means is adapted to divert the beer flowing through the beer infusing and flavouring device into the infusing and flavouring holding means and then out through the outlet passage such that the beer exiting the outlet passage is infused and/or flavoured.

In a fourth aspect the invention resides in a beer infusing and flavouring device, typically for the infusing and/or flavouring of alcoholic beverages such as beer, the beer infusing and flavouring device includes:
  i. an inlet passage through which beer is adapted to flow in to the beer infusing and flavouring device;
  ii. an outlet passage through which the beer is adapted to flow out of the beer infusing and flavouring device;
  iii. a holding means for holding a desired infusible and/or flavouring substance therein, the holding means is adapted to be in selective fluid communication with the inlet and outlet passages; and
  iv. a diverting means positioned between the inlet passage and outlet passage and operable between a non infusing-flavouring mode and an infusing-flavouring mode In a fifth aspect the invention resides in a method of infusing and/or flavouring beer, wherein the method includes:
  i. passing beer through an inlet passage of a beer infusing and flavouring device having a replaceable holding means for holding a desired infusible and/or flavouring substance therein, the holding means is adapted to be in selective fluid communication with the inlet passage and an outlet passage of the beer infusing and flavouring device;
  ii. selectively operating a diverting means of the beer infusing and flavouring device to an infusing-flavouring mode such that beer is able to be diverted to the holding means and infused and/or flavoured;

iii. passing the infused and/or flavoured beer out through outlet passage to the dispensing tap where the flavoured beer is able to be dispensed.
iv. selectively operating the diverting means to a non infusing-flavouring mode such that beer is able to be by pass to the holding means such that non infused and/or non flavoured beer is able to be dispensed and allow the holding means to be replaced with another holding means containing a different infusing and/or flavouring substance; and
v. repeating steps i to iii.

In other aspects herein described

BRIEF DESCRIPTION

The invention will now be described, by way of example only, by reference to the accompanying drawings:

FIG. 1 is a plan view of a liquid infusing and flavouring device attached to a beer dispensing tap in accordance with a first preferred embodiment of the invention.

FIG. 2 is a cut-away side view of the liquid infusing and flavouring device in an infusing and flavouring position in accordance with a first preferred embodiment of the invention FIG. 3 is a cut-away side view of the liquid infusing and flavouring device in a non infusing and flavouring position in accordance with a first preferred embodiment of the invention.

FIG. 4 is a top view of the liquid infusing and flavouring device in an infusing and flavouring position in accordance with a first preferred embodiment of the invention.

FIG. 5 is a top view of the liquid infusing and flavouring device in a non infusing and flavouring position in accordance with a first preferred embodiment of the invention.

DESCRIPTION OF DRAWINGS

The following description will describe the invention in relation to preferred embodiments of the invention, namely a liquid infusing and flavouring device, typically for the infusing and flavouring of alcoholic beverages such as beer. The following description pertains to the application of the invention in respect of infusing and flavouring beer, however the invention is equally applicable to the flavouring of other liquids/beverages. The invention is in no way limited to these preferred embodiments as they are purely to exemplify the invention only and that possible variations and modifications would be readily apparent without departing from the scope of the invention.

Figure 1:
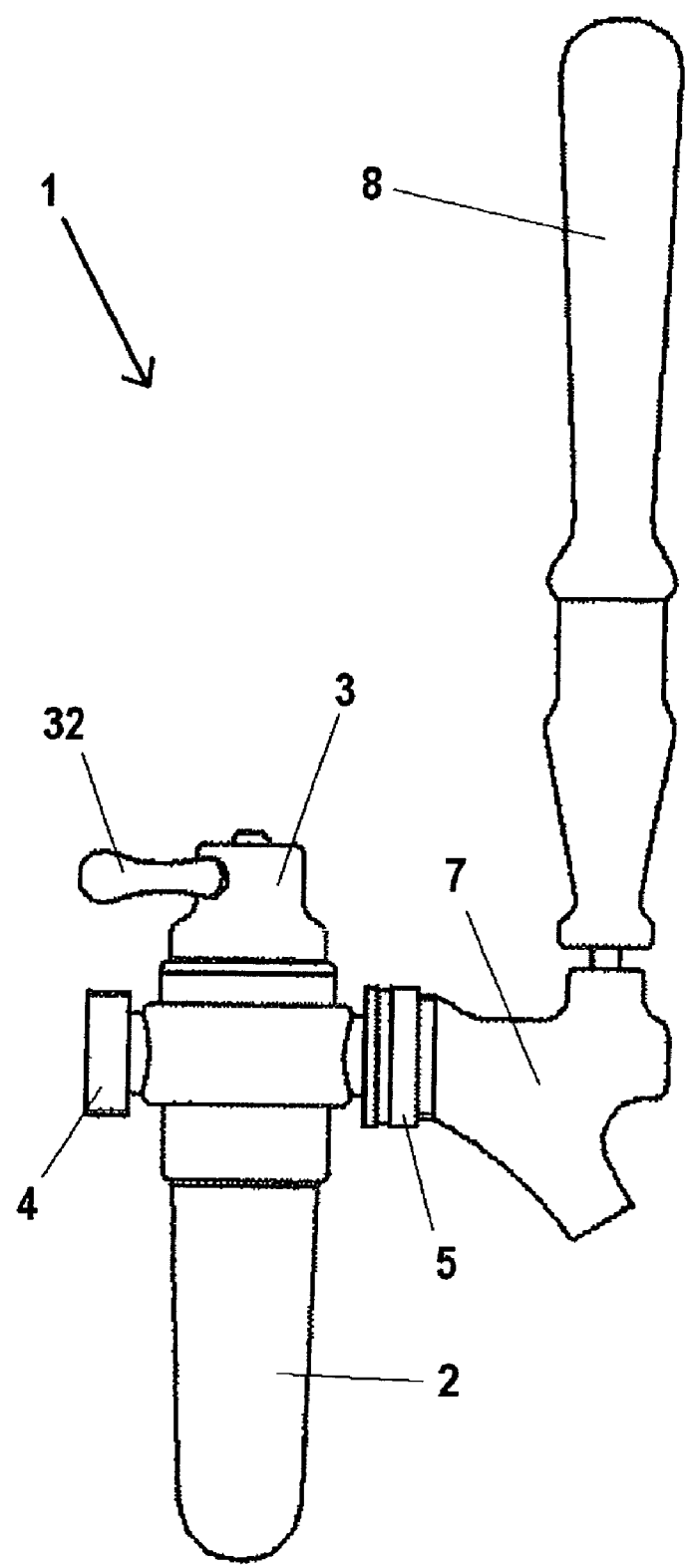
FIG. 1 shows the invention as it is applied to a beer dispenser. The beer infusing and flavouring device 1 is shown attached to a beer dispenser having a beer tap and beer dispensing handle 8. The details pertaining to the beer infusing and flavouring device 1 will now be described in relation to FIGS. 2 to 5.
Figure 2:
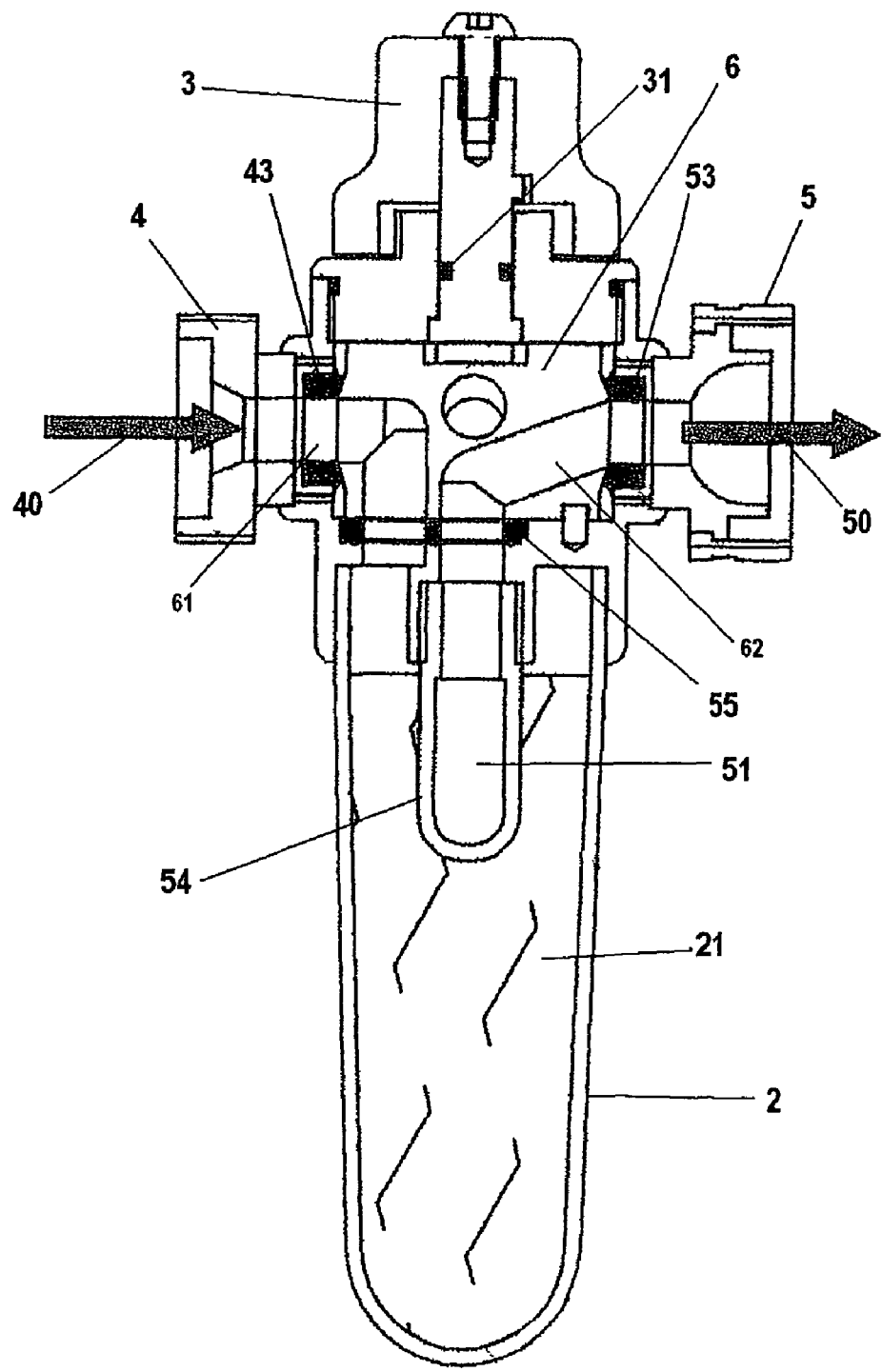
Figure 3:
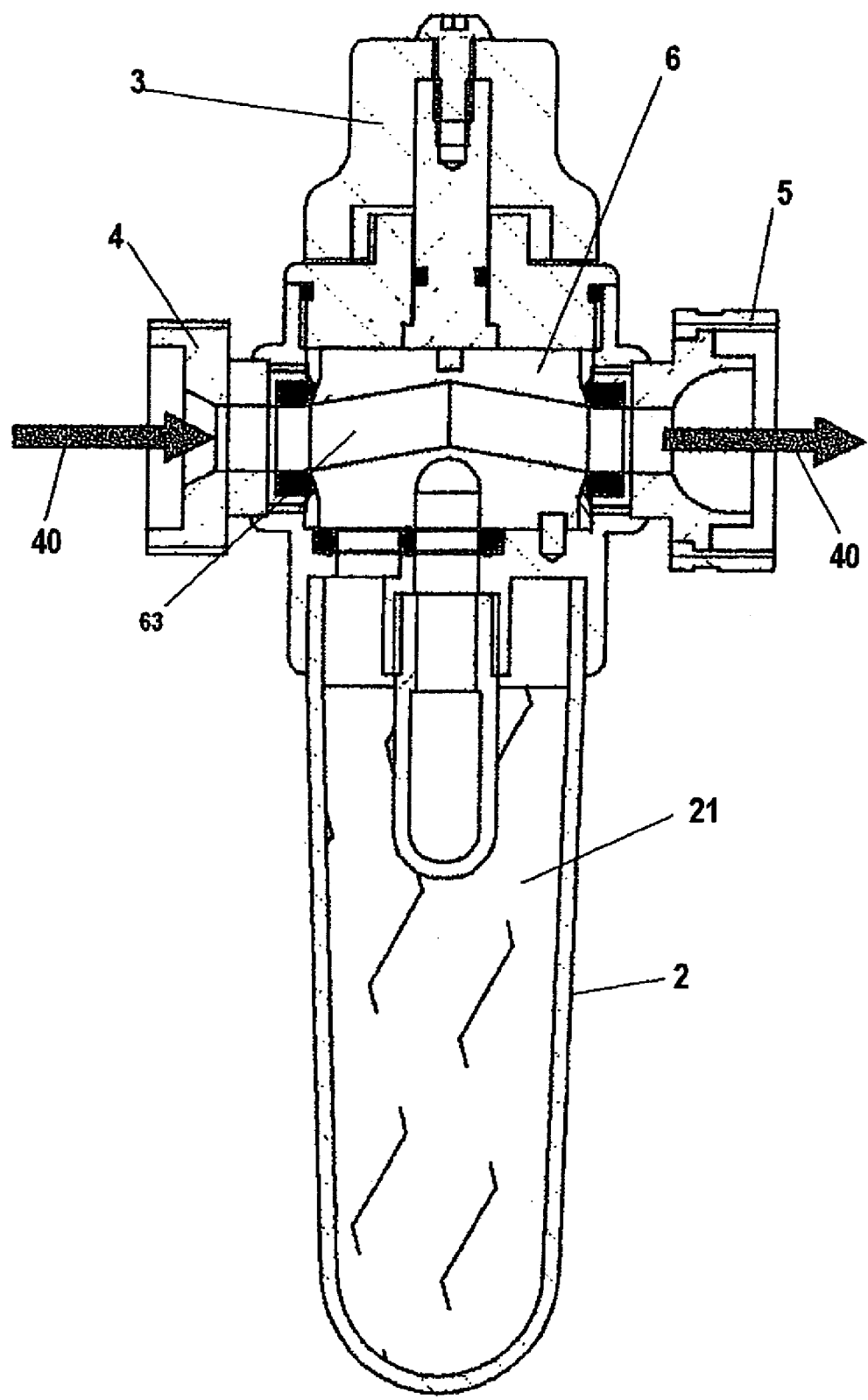
Figure 4:
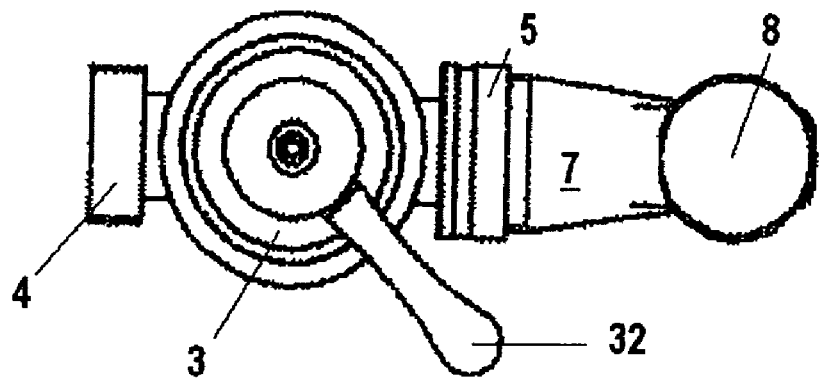
Figure 5:
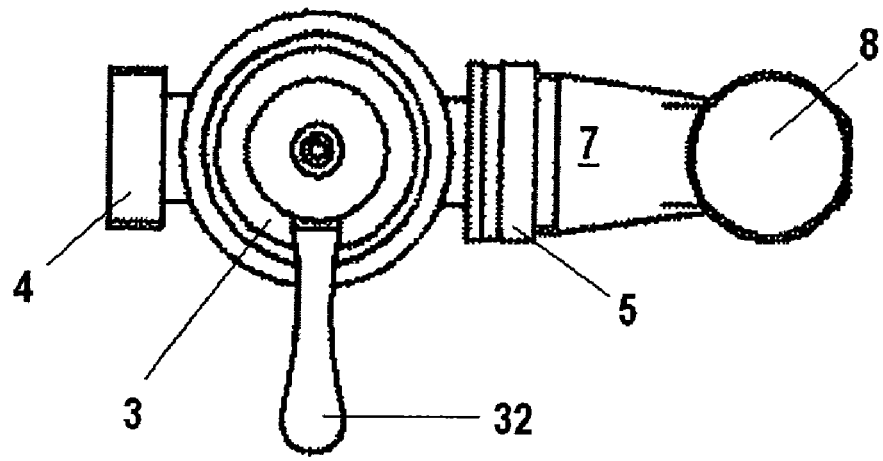

The beer infusing and flavouring device 1 includes an inlet passage 4 connectable to a supply of beer to allow beer 40 to flow into the beer infusing and flavouring device 1. An outlet passage 5 allows the beer to flow out of the beer infusing and flavouring device 1 and which the outlet passage 5 is connectable to the inlet portion of a beer dispensing tap 7. The beer infusing and flavouring device 1 has a container 2 that houses the infusing and/or flavouring substance 21. The container 2 is in selective fluid communication with the with the inlet and outlet passages 4, 5. In order to allow the beer to pass through the beer infusing and flavouring device 1, there is situated between the inlet and outlet passages 4, 5 a three way valve operable between a non infusing-flavouring mode (FIGS. 3 and 5) and an infusing-flavouring mode (FIGS. 2 and 4).

The three way valve includes a handle portion 3 with handle 32 whereby the handle portion 3 is operable between the non infusing-flavouring mode and the infusing-flavouring mode. The valve has a rotary valve member 6 connected to the handle portion 3 such that upon rotation of the handle 32 to the non infusing-flavouring mode (FIG. 5) the rotary valve member 6 is in a non infusing and/or flavouring position (FIG. 3) and when the handle is in the infusing-flavouring mode (FIG. 4) rotary valve member 6 is in an infusing-flavouring position (FIG. 2).

The rotary valve member 6 has a by-pass passage 63, an inlet diverting passage 61 and an outlet diverting passage 62. When in the non-infusing-flavouring position (FIG. 2) the by-pass passage 63 is in fluid communication with both the inlet and outlet passages 4, 5 to allow the beer 40 to flow directly there-through so as to by pass the container 2 and thus the beer is not infused and/or flavoured. On the other hand when the rotary valve member 6 is in the infusing-flavouring position (FIG. 3) the inlet diverting passage 61 is in fluid communication with the container 2 and the outlet diverting passage 62 is in fluid communication with the container 2 and the outlet passage 5 so that beer 40 flowing through the beer infusing and flavouring device 1 is diverted into the container to be infused and/or flavoured before exiting (50) the outlet passage 5 in order to produce an infused and/or flavoured beer.

A micron filter 54 can be situated between the container 2 and the outlet passage 5, preferably the filter 54 is positioned adjacent and in communication with an inlet end 51 of the diverting outlet passage 52 in order to filter the infused and/or flavoured beer.

The valve has valve seals 31, 43, 53, 55 sealing the rotary interfaces of the rotary portions of the valve relative to the valve body.

The beer is able to be infused and/or flavoured with any one of the fruit, herbs, spices, flowers, hops, syrups, plants, extracts of the aforementioned, or any other suitable infusible and/or flavouring substance or any combination thereof. The infusible and/or flavourable substance are in either solid, particulate, granular, powdered, paste, semi beer, vapour or gaseous form The container 2 is able to be releasably attached by suitable known means (e.g known screw or snap on arrangements) to the beer infusing and flavouring device 1 so that the container is able to be replaced with another container containing a different infusible and/or flavouring substance or the infusible and/or flavouring substance within the container is able is able to be replenished or replaced with a different infusible and/or flavouring substance.

In operation the beer infusing and flavouring device is coupled to a pressurised beer supply line at inlet passage 4 and the outlet passage 5 is coupled to an inlet end of a beer, dispensing tap 7. A number of containers are filled with a range of desired infusing and/or flouring substance. Initially the beer infusing and flavouring device 1 is in the non infusing-flavouring mode (FIGS. 3 and 5) and un-infused and/or unflavoured beer is dispensed in the usual manner. When a customer desires a particular infused and/or flavoured beer the container containing such desired infusing and or flavouring substance is attached to the beer infusing and flavouring device 1. Then the handle 32 is rotated to the infusing-flavouring mode (FIGS. 2 & 4) thus allowing beer entering into the beer infusing and flavouring device 1 to be diverted along diverting passage 61 into the container where the beer is infused and/flavoured with the infusing and/or flavouring substance 21 as it flows through the container and out through the diverting passage 62 and dispensed through tap 7. Upon completion dispensing of the requested infused and/or flavoured beer the handle is rotated back to the non infusing-flavouring mode to allow non infused and/or unflavoured beer to be dispensed. When another request for infused and/or flavoured beer is desired the infusing and/or flavouring step is repeated.

Advantages a) Infusion is at the point of dispensing (point of purchase) beer consumption rather than during the brewing process.

b) The consumer is able to select the infusible flavouring substance to be added to beer at the final point of dispense for drinking and observe infusion process.

c) The consumer can vary the amount of infusion by halving or doubling the amount (or in an infinite variety of combinations) of an infusible flavouring substance by use of the three-way valve and or by the addition of farther infuser bowls during dispense.

Variations

Throughout the description of this specification, the word "comprise" and variations of that word such as "comprising" and "comprises", are not intended to exclude other additives, components, integers or steps.

It will of course be realised that while the foregoing has been given by way of illustrative example of this invention, all such and other modifications and variations thereto as would be apparent to persons skilled in the art are deemed to fall within the broad scope and ambit of this invention as is herein set forth and as claimed in the appended claim set.

The invention claimed is:

1. A liquid infusing and flavouring device for the infusing and/or flavouring of liquids, comprising:
   i. an inlet passage through which a liquid is adapted to flow in to the liquid infusing and flavouring device;
   ii. an outlet passage through which the liquid is adapted to flow out of the liquid infusing and flavouring device;
   iii. a holding means for holding a desired infusible and/or flavouring substance therein, the holding means is adapted to be in selective fluid communication with the inlet and outlet passages; and
   iv. a diverting means positioned between the inlet passage and outlet passage and operable to selectively direct the flow of the liquid between:
      an infusing-flavouring mode wherein the diverting means diverts all of the flow of liquid to flow into the holding means for infusing and/or flavouring, and
      a non-infusing-flavouring mode wherein the flow of liquid bypasses the holding means while a volume of liquid is retained within the holding means for further infusing and/or flavouring.

2. The liquid infusing and flavouring device as claimed in claim 1, wherein the liquid is an alcoholic beverage.

3. The liquid infusing and flavouring device as claimed in claim 1, wherein the liquid is beer.

4. The liquid infusing and flavouring device as claimed in claim 1, wherein the liquid is suitable to be infused and/or flavoured with any one of the fruit, herbs, spices, flowers, hops, syrups, plants, extracts of the aforementioned, or any other suitable infusible and/or flavouring substance or any combination thereof.

5. The liquid infusing and flavouring device as claimed in claim 1, wherein the infusible and/or flavourable substance are in either solid, particulate, granular, powdered, paste, semi liquid, vapour or gaseous form.

6. The liquid infusing and flavouring device as claimed in claim 1, wherein the holding means is a container adapted to contain the infusible and/or flavourable substance therein.

7. The liquid infusing and flavouring device as claimed in claim 6, wherein the container is releaseably attachable to the liquid infusing and flavouring device so that the container is able to be replaced with another container containing a different infusible and/or flavouring substance.

8. The liquid infusing and flavouring device as claimed in claim 6, wherein the container is releaseably attachable to the liquid infusing and flavouring device so that the infusible and/or flavouring substance within the container is able to be replaced with a different infusible and/or flavouring substance.

9. The liquid infusing and flavouring device as claimed in claim 1, wherein, the diverting means is a valve adapted to be operable between the non infusing-flavouring mode and the infusing-flavouring mode.

10. The liquid infusing and flavouring device as claimed in claim 9, wherein, the valve is a three-way valve.

11. The liquid infusing and flavouring device as claimed in claim 10, wherein the three-way valve has a valve body connected and in fluid communication with the inlet and outlet passages, wherein the valve body includes:
   i. a handle adapted to operate the valve between the non infusing-flavouring mode and the infusing-flavouring mode; and
   ii. a rotary valve member having a by-pass passage, an inlet diverting passage and an outlet diverting passage, the rotary valve member is connectable to the handle and adapted to rotate upon operation of the handle between a non infusing flavouring position when the handle is in the non infusing-flavouring mode and an infusing-flavouring position when the handle is in the infusing-flavouring mode, such that when in the non-infusing-flavouring position the by-pass passage is in fluid communication with both the inlet and outlet passages to allow the liquid to flow directly there-through so to bypass the holding means, and when the rotary valve member is in the infusing-flavouring position the inlet diverting passage is in fluid communication with the holding means and the outlet diverting passage is in fluid communication with the holding means and the outlet passage so that liquid flowing through the liquid infusing and flavouring device is diverted into the holding means to be infused and/or flavoured before exiting the outlet passage in order to produce an infused and/or flavoured liquid.

12. The liquid infusing and flavouring device as claimed in claim 1, wherein a filtering means is situated between the holding means and the outlet passage in order to filter the infused and/or flavoured liquid.

13. The liquid infusing and flavouring device as claimed in claim 12, wherein the filtering means is positioned adjacent and in communication with an inlet end of the diverting outlet passage.

14. The liquid infusing and flavouring device as claimed in claim 13, wherein the filtering means is a micron filter.

15. The liquid infusing and flavouring device as claimed in claim 1, wherein the diverting means, when in the non infusing-flavouring mode, is adapted to cause the liquid flowing through the liquid infusing and flavouring device to by-pass the holding means.

16. The liquid infusing and flavouring device as claimed in claim 1, wherein the diverting means, when in the infusing-flavouring mode, is adapted to divert the liquid flowing through the liquid infusing and flavouring device into the holding means and then out through the outlet passage such that the liquid exiting the outlet passage is infused and/or flavoured.

17. The liquid infusing and flavouring device as claimed in claim 10, wherein the three-way valve has a valve body connected and in fluid communication with the inlet and outlet passages, wherein the valve body includes:
  i. a handle adapted to operate the valve between the non infusing-flavouring mode and the infusing-flavouring mode; and
  ii. a rotary valve member is connectable to the handle and adapted to rotate upon operation of the handle between the non infusing-flavouring mode when the handle is in the non infusing-flavouring mode and an infusing-flavouring position when the handle is in the infusing-flavouring mode.

18. The liquid infusing and flavouring device as claimed in claim 17, wherein the rotary valve member has a by-pass passage, an inlet diverting passage and an outlet diverting passage, wherein when in the non-infusing-flavouring position the by-pass passage is in fluid communication with both the inlet and outlet passages to allow the liquid to flow directly there-through so as to by pass the holding means and when the rotary valve member is in the infusing-flavouring position the inlet diverting passage is in fluid communication with the holding means and the outlet diverting passage is in fluid communication with the holding means and the outlet passage so that liquid flowing through the liquid infusing and flavouring device is diverted into the holding means to be infused and/or flavoured before exiting the outlet passage in order to produce an infused and/or flavoured liquid.

19. A beer infusing and flavouring device for the infusing and/or flavouring of beer, comprising:
  i. an inlet passage through which beer is adapted to flow in to the beer infusing and flavouring device;
  ii. an outlet passage through which the beer is adapted to flow out of the beer infusing and flavouring device;
  iii. a holding means for holding a desired infusible and/or flavouring substance therein, the holding means is adapted to be in selective fluid communication with the inlet and outlet passages; and
  iv. a diverting means positioned between the inlet passage and outlet passage and operable to selectively direct the flow of the beer between:
    an infusing-flavouring mode wherein the diverting means diverts all of the flow of beer to flow into the holding means for infusing and/or flavouring, and
    a infusing-flavouring mode wherein the flow of beer bypasses the holding means while a volume of beer is retained within the holding means for further infusing and/or flavouring.

* * * * *